(12) United States Patent
Carroni et al.

(10) Patent No.: US 10,041,379 B2
(45) Date of Patent: Aug. 7, 2018

(54) METHOD FOR OPERATING A COMBINED CYCLE POWER PLANT AND COMBINED CYCLE POWER PLANT FOR CONDUCTING SAID METHOD

(71) Applicant: ALSTOM Technology Ltd, Baden (CH)

(72) Inventors: Richard Carroni, Niederrohrdorf (CH); Henrik Nielsen, Baden (CH); François Droux, Oberrohrdorf (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 987 days.

(21) Appl. No.: 14/496,917

(22) Filed: Sep. 25, 2014

(65) Prior Publication Data
US 2015/0007578 A1 Jan. 8, 2015

Related U.S. Application Data

(63) Continuation of application No. PCT/EP2013/056205, filed on Mar. 25, 2013.

(30) Foreign Application Priority Data

Mar. 29, 2012 (EP) ..................................... 12162096

(51) Int. Cl.
*F01K 23/10* (2006.01)
*F03G 6/00* (2006.01)
(Continued)

(52) U.S. Cl.
CPC ................ *F01K 23/10* (2013.01); *F01K 7/22* (2013.01); *F01K 7/226* (2013.01); *F01K 23/14* (2013.01);
(Continued)

(58) Field of Classification Search
CPC . F01K 23/10; F01K 23/14; F01K 7/22; F01K 7/226; F03G 6/003; Y02E 10/46; Y02E 20/16
(Continued)

(56) References Cited

U.S. PATENT DOCUMENTS 4,355,514 A * 10/1982 Reifenberg ............... F01K 7/24
60/657
6,442,924 B1 9/2002 Talley et al.
(Continued)

FOREIGN PATENT DOCUMENTS

DE 41 26 038 A1 2/1993
DE 44 09 197 A1 9/1995
(Continued)

*Primary Examiner* — Hoang Nguyen

(57) ABSTRACT

The invention relates to a method for operating a combined cycle power plant, which includes a steam turbine powertrain with a high-pressure steam turbine, an intermediate pressure steam turbine and a low-pressure steam turbine, whereby intermediate pressure steam flowing from the exit of the high-pressure steam turbine to the inlet of the intermediate pressure steam turbine is reheated by means of the reheat device, and which is connected to a solar thermal plant, that generates additional solar steam for being used by said steam turbine powertrain. The output of the solar steam generator is used more effectively, and the overall plant performance, flexibility and operability are enhanced by at least part of the additional solar steam reaching the intermediate pressure steam turbine without being reheated in said reheat device.

14 Claims, 3 Drawing Sheets

(51) Int. Cl.
  *F01K 7/22* (2006.01)
  *F22B 1/00* (2006.01)
  *F01K 23/14* (2006.01)

(52) U.S. Cl.
  CPC .............. *F03G 6/003* (2013.01); *F22B 1/006* (2013.01); *Y02E 10/46* (2013.01); *Y02E 20/16* (2013.01)

(58) Field of Classification Search
  USPC .......... 60/19.182, 653, 654, 677–680, 641.8, 60/9.182, 641.83
  See application file for complete search history.

(56) References Cited

U.S. PATENT DOCUMENTS

| | | | | |
|---|---|---|---|---|
| 8,544,273 | B2* | 10/2013 | Brenmiller | F03G 6/067 60/641.8 |
| 8,863,521 | B2* | 10/2014 | Goto | F01K 3/06 60/653 |
| 2011/0127773 | A1 | 6/2011 | Freund et al. | |
| 2012/0000202 | A1* | 1/2012 | Menendez Salcedo | F01K 7/223 60/653 |
| 2013/0312416 | A1* | 11/2013 | Herzog | F01K 7/223 60/653 |
| 2014/0033676 | A1* | 2/2014 | Pang | F03G 6/00 60/39.182 |
| 2014/0060053 | A1* | 3/2014 | Wolf | F01K 7/22 60/676 |

FOREIGN PATENT DOCUMENTS

| | | |
|---|---|---|
| EP | 0 526 816 A1 | 2/1993 |
| EP | 1 164 254 B1 | 4/2009 |
| EP | 2 372 116 A1 | 10/2011 |

* cited by examiner

METHOD FOR OPERATING A COMBINED CYCLE POWER PLANT AND COMBINED CYCLE POWER PLANT FOR CONDUCTING SAID METHOD

CROSS-REFERENCE TO RELATED APPLICATIONS

This application claims priority to PCT/EP2013/056205 filed Mar. 25, 2013, which claims priority to European application 12162096.7 filed Mar. 29, 2012, both of which are hereby incorporated in their entireties.

TECHNICAL FIELD

The invention lies in the field of power generation. It relates to a method for operating a combined cycle power plant. It further relates to a combined cycle power plant for conducting such a method.

BACKGROUND

FIG. 1 depicts a typical steam turbine powertrain of a power plant PP 1 and the main associated steam lines. The steam turbine powertrain comprises high-pressure steam turbine 10, intermediate pressure steam turbine 11 and low-pressure steam turbine 12. High-pressure steam 13 (with or without supplementary firing) enters high-pressure steam turbine 10. Intermediate pressure steam 16 exits high-pressure steam turbine 10, flows through cold reheat line 14 to reheat device 17 (which may be part of the heat recovery steam generator), is reheated and flows then through hot reheat line 15 to intermediate pressure steam turbine 11. Finally, low-pressure steam 18 exits intermediate pressure steam turbine 11 and enters low-pressure steam turbine 12. If present, the degree of supplementary firing (SF) employed is limited by the inlet pressure of high-pressure steam turbine 10 and the associated water/steam cycle pressures.

Document U.S. Pat. No. 6,442,924 teaches, within the context of supplementary firing, the art of injecting the steam generated by the duct burners, into locations downstream of the inlet of high-pressure steam turbine 10 (see power plant PP 2 in FIG. 2). This measure permits a high-pressure steam turbine of a given design to always run at its design point (i.e. approximately constant pressure and mass flow rate), thereby performing optimally both with and without supplementary firing. FIG. 2 illustrates the various points A, B and C at which all of the additional steam raised by a supplementary firing can be injected (see arrows). However, this document does not describe increasing the mass flow rate through the high-pressure steam turbine 10.

FIG. 3 shows a typical arrangement of the so-called ISCC (Integrated Solar Combined Cycle) power plant PP3, wherein the solar field of a solar thermal plant 20 (preferably via a central receiver technology) is used to generate additional solar steam 21, which is then injected into (or slightly upstream of) the high-pressure steam turbine 10. An example of an ISCC is disclosed in document EP 2 372 116 A1.

Configuring a combined cycle plant to operate in tandem with a solar steam generator and maximizing the overall plant flexibility leads to the identification of the issues 1-3 listed below, whose resolution (a) increases the performance of the plant and (b) ensures high degrees of flexibility:

1. The solar fields might produce more steam than can be accommodated by the high-pressure steam turbine 10. For instance, at 100% gas turbine load, a limited amount of solar steam 21 can be typically added so as to remain within the pressure limit at the inlet of the high-pressure steam turbine 10. Since oversizing the high-pressure steam turbine 10 leads to performance reductions in the absence of solar steam 21, a significant quantity of solar steam 21 is rejected. This is a sub-optimal use of the expensive solar field.
2. It is potentially possible to run the ISCC in pure solar mode; i.e. the gas turbines (not shown in the Figures) are switched off and the steam turbines 10, 11 and 12 are driven by steam that is generated exclusively by the solar field. Unfortunately, the cold reheat steam temperature falls during the long reheater section, resulting in steam that is saturated, or only a few degrees above saturation, at the inlet of the low-pressure steam turbine 12. The intolerance of such wet steam by the intermediate pressure steam turbine 11 (exit) and the low-pressure steam turbine 12 (inlet), therefore, precludes pure solar operation.
3. The solar steam quality and quantity cannot be constantly matched to the requirements of the steam turbine. This is problematic during planned transients (e.g. changing of plant load, changing of solar contribution) as well as during unplanned perturbations (e.g. rapid load changes, variable cloud cover), because large changes (>50° C.) at the inlet of any of the steam turbine modules resulting in tripping of the steam turbine powertrain.

SUMMARY

It is an object of the invention to propose a method for operating an ISCC power plant, whereby the output of the solar steam generator is used more effectively, and in which the overall plant performance, flexibility and operability are enhanced.

It is a further object of the invention to provide the ISCC power plant for conducting such a method.

These and other objects are accomplished by a method according to claim 1 and a combined cycle power plant according to claim 9.

The inventive method relates to the operation of a combined cycle power plant, which comprises a steam turbine powertrain with a high-pressure steam turbine, an intermediate pressure steam turbine and a low-pressure steam turbine, whereby intermediate pressure steam flowing from the exit of the high-pressure steam turbine to the inlet of the intermediate pressure steam turbine is reheated by means of the reheat device, and which is connected to a solar thermal plant, that generates additional solar steam for being used by said steam turbine powertrain. The inventive method is characterized in that at least part of the additional solar steam reaches the intermediate pressure steam turbine without being reheated in said reheat device.

According to an embodiment of the inventive method at least part of the additional solar steam is directly injected into a hot reheat line connecting said reheat device with the inlet of said intermediate pressure steam turbine.

According to another embodiment of the inventive method at least part of the additional solar steam is directly injected into the inlet of said intermediate pressure steam turbine.

Specifically, said part of the additional solar steam, which is directly injected into a hot reheat line or inlet of said intermediate pressure steam turbine, is controllably throttled, especially be means of a control valve.

According to an further embodiment of the inventive method, in order to avoid cooling of the cold reheat steam in pure solar mode, the additional solar steam is injected into the inlet of the high-pressure steam turbine, and at least part of the intermediate pressure steam bypasses the reheat device on its way to the intermediate pressure steam turbine.

According to another embodiment of the inventive method, in order to cater for any circumstances potentially resulting in large temperature changes at the inlets of the steam turbines, part of the additional solar steam is directly injected into the cold reheat line connecting the exit of the high-pressure steam turbine and the reheat device and bypasses the reheat device through a reheat bypass line, or is directly injected into a hot reheat line connecting said reheat device with the inlet of said intermediate pressure steam turbine.

Specifically, the high-pressure steam turbine bypass line is provided for bypassing the high-pressure steam turbine, and that part of the additional solar steam flows to the cold reheat line to said high-pressure steam bypass line.

More specifically, the extent of the intermediate pressure solar steam flow is adjusted to simultaneously ensure that the high-pressure steam turbine exit temperatures are within design limits.

The inventive combined cycle power plant for conducting a method according to the invention comprises a steam turbine powertrain with a high-pressure steam turbine, an intermediate pressure steam turbine and a low-pressure steam turbine, whereby a reheat device is provided between the exit of said high-pressure steam turbine and the inlet of said intermediate pressure steam turbine, and a solar thermal plant that generates additional solar steam for being used by said steam turbine powertrain, is connected to the inlet of said high-pressure steam turbine. It is characterized in that a way for the additional solar steam is provided to reach the inlet of said intermediate pressure steam turbine without being reheated in said reheat device.

According to an embodiment of the invention, the solar thermal plant is directly connected to the inlet of said intermediate pressure steam turbine by means of a lower pressure solar steam line.

Specifically, a control valve for throttling the solar steam is provided in said lower pressure solar steam line.

According to another embodiment of the invention a reheat bypass line is provided between the cold reheat side and the hot reheat side of the reheat device.

Specifically, a high-pressure steam turbine bypass line is provided at said high-pressure steam turbine.

More specifically, said steam turbine powertrain has a common shaft, and that said high-pressure steam turbine is disconnectable from the rest of the shaft to permit more rapid operational transients.

Preferably, a self-synchronizing clutch is provided between the high-pressure steam turbine and the rest of the shaft.

BRIEF DESCRIPTION OF THE DRAWINGS

The invention shall now be explained by means of different embodiments in connection with the drawings.

DETAILED DESCRIPTION

Figure 1:
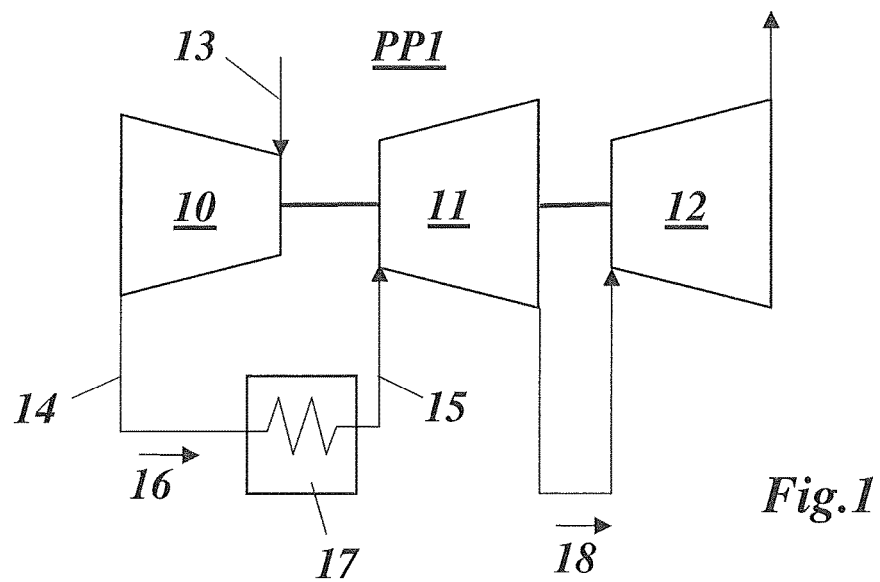
FIG. 1 shows a simplified scheme of a typical turbine powertrain according to the prior art.
Figure 2:
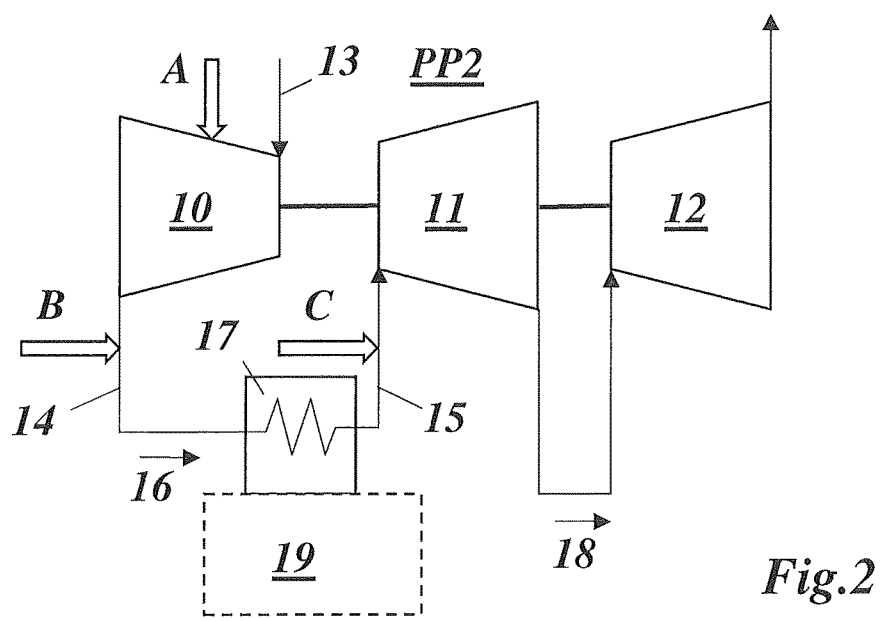
FIG. 2 shows a simplified scheme of a steam turbine powertrain with injection of additional steam generated by supplementary firing, according to the prior art.
Figure 3:
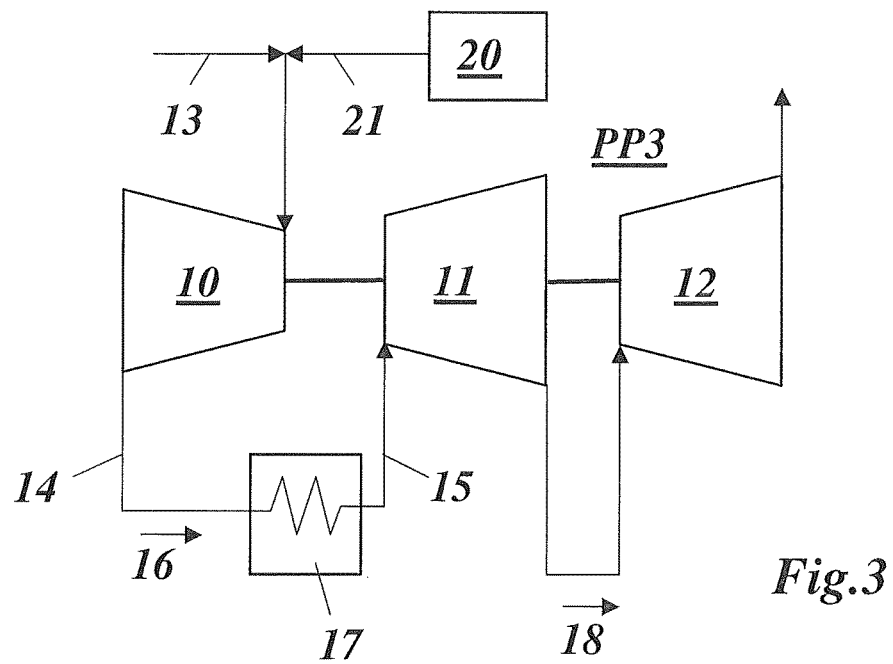
FIG. 3 shows a simplified scheme of a steam turbine powertrain, which incorporates solar steam into its water/steam cycle.
Figure 4:
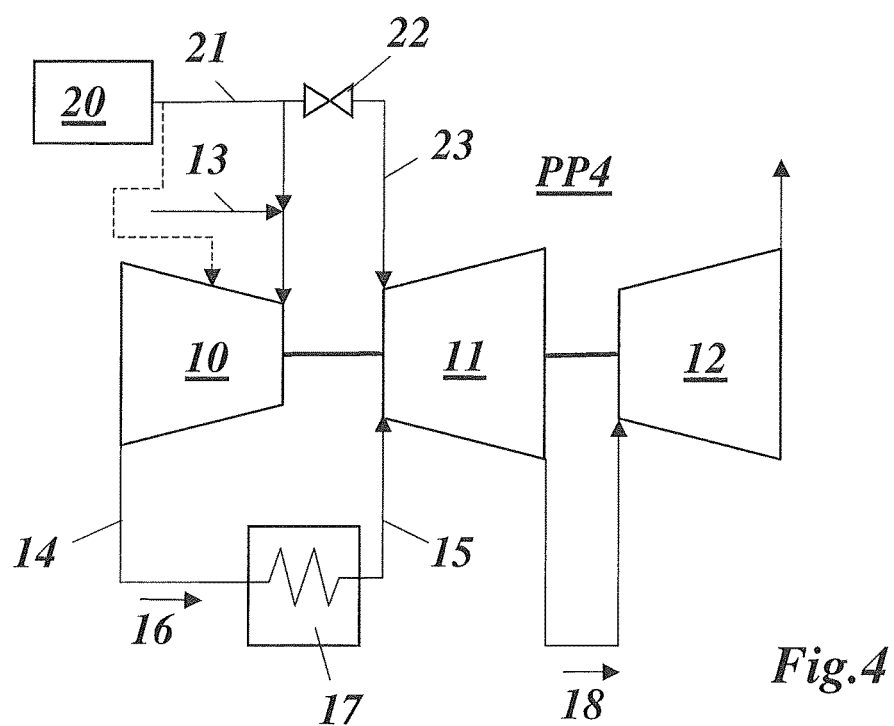
FIG. 4 shows a simplified scheme of a steam turbine powertrain with independent introduction of lower pressure solar steam directly into the intermediate pressure steam turbine according to an embodiment of the invention.

According to the invention it is proposed to implement a direct line, complete with its own control valve 22, from the main solar steam line directly to the inlet of the intermediate pressure steam turbine 11, as illustrated in FIG. 4. Such a configuration permits any excess solar steam that cannot be accommodated by the high-pressure steam turbine (due to pressure limits at the high-pressure steam turbine inlet) to be throttled as needed and injected into the hot reheat line 15 and/or into the intermediate pressure steam turbine; alternatively, part of the solar steam can be injected along the high-pressure steam turbine (between inlet and exit), as shown with the dashed line in FIG. 4). The performance benefit is highlighted in table 1 below.

TABLE 1

| GT load [%] | Solar steam in HP ST only [MWel] | Solar steam in HP&IP ST [MWel] | Δ Power [MWel] |
| --- | --- | --- | --- |
| 100 | 643.9 | Up to 659 | Up to 15 |
| 95 | 615.5 | 626.0 | 10.5 |
| 90 | 597.2 | 603.6 | 6.4 |
| 85 | 579.1 | 582.0 | 2.9 |
| 81 | 564.5 | 564.5 | 0 |

At 100% GT load, this technique increases the solar electric power by up to 15 MW (from 71 MW to 86 MW), thereby halving solar wastage. Extending the inlet pressure limits of the intermediate pressure steam turbine 11 (a relatively minor matter, since the nominal pressure is only 45 bar—compared to 160 bar at the inlet of the high-pressure steam turbine 10) would permit more, or all, the excess solar steam to be accommodated. Such a minor upgrading of the respective intermediate pressure drum (i.e. without step change in technology) permits standard drum wall thicknesses to be used and therefore do not hinder the high cycling capacity of a modern combined cycle power plant CCPP.

This idea can be used for single-shaft as well as multi-shaft power plant configurations.

Figure 5:
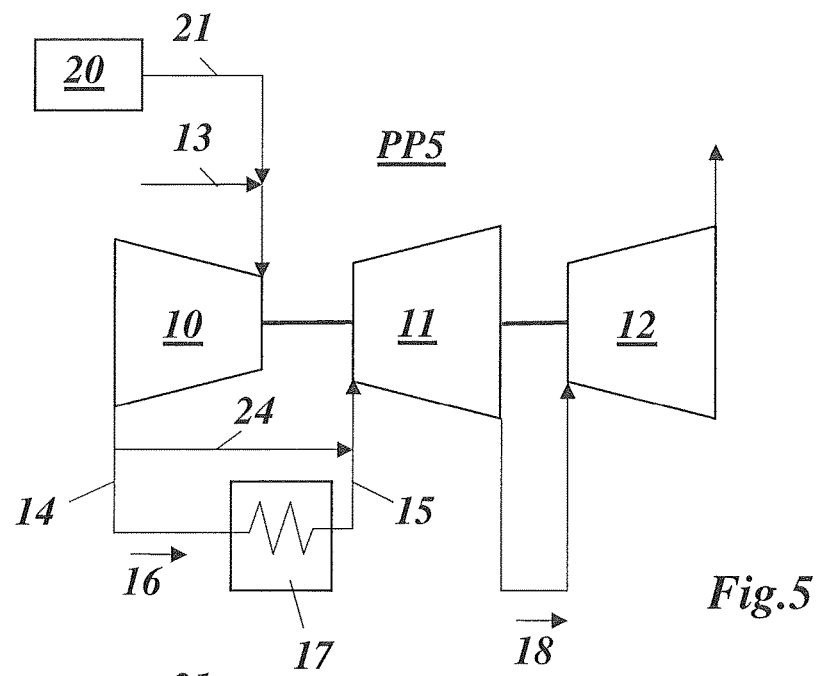
FIG. 5 shows a simplified scheme of a steam turbine powertrain, similar to FIG. 3, but with an additional reheat bypass line according to another embodiment of the invention.

In order to avoid cooling of the cold reheat steam and in pure solar mode, it is further proposed to bypass the reheat line (reheat device 17) by means of a reheat bypass line 24 such that the cold reheat steam of cold reheat line 14 is fed directly to the inlet of the intermediate pressure steam turbine 11 as indicated for power plant PP5 in FIG. 5. Implementing this technique ensures a satisfactory margin above saturation at the inlet of the low-pressure steam turbine 12. Effectively, this method is indispensable for enabling operation in pure solar mode. This is because, if the cold reheat steam temperature falls by only 30° C., then the intermediate pressure steam turbine exhaust steam and the low-pressure steam turbine inlet steam are saturated.

Closer inspection of the CCPP process flow diagram reveals that the reheat bypass line 24 is also necessary for permitting solar operation during transients involving the heat recovery steam generator (e.g. gas turbine startup or shut down), because routing of the recovery steam generator bypass steam is completely isolated from that of the solar steam 21.

The methodology described in FIG. 4 can also be applied to cater for any circumstances potentially resulting in large temperature changes at the steam turbine inlets. For instance, during the transition from ISCC to pure solar mode, in which the gas turbines are turned off and the reheat function thus ceases, the temperature at the intermediate pressure steam turbine inlet falls by as much as 150° C. In order to prevent this, part of the hot solar steam 21 is added (with the help of the existing high-pressure steam turbine bypass, 25 in FIG. 6, including attemperation to cold reheat conditions, see FIG. 6) directly to the cold reheat flow (line 14), which bypasses the reheat line (17) or to the hot reheat flow (line 15). The extent of intermediate pressure solar flow must be adjusted so as to ensure that the high-pressure steam turbine exit temperatures are within design limits.

Figure 6:
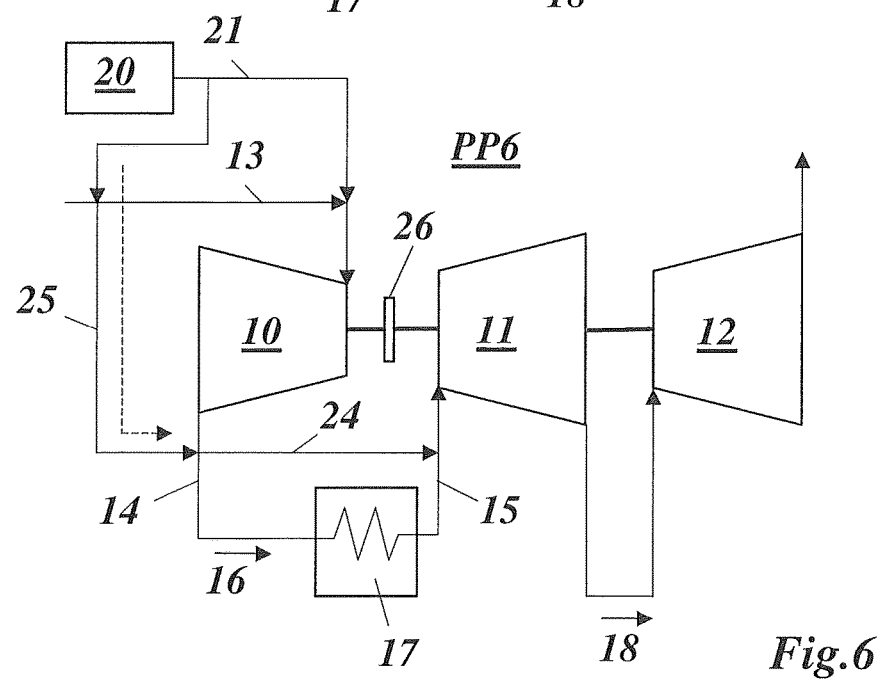
FIG. 6 shows a simplified scheme of a steam turbine powertrain with means for preventing excessive temperature drops at the intermediate pressure steam turbine inlet according to a further embodiment of the invention.

Disconnecting of the high-pressure steam turbine 10 from the rest of the shaft is an additional measure that could be taken to permit more rapid transients to be followed. Such a technique could be realized by adding a self-synchronizing clutch (SSC) 26 (FIG. 6).

The invention claimed is:

1. A method for operating a combined cycle power plant, which includes a steam turbine powertrain comprising a high-pressure steam turbine, an intermediate pressure steam turbine and a low-pressure steam turbine, the method comprising:
    reheating, by a reheat device, intermediate pressure steam flowing from the exit of the high-pressure steam turbine to the inlet of the intermediate pressure steam turbine, the reheat device being connected to a solar thermal plant; and
    generating additional solar steam for use by said steam turbine powertrain, wherein at least a portion of the additional solar steam is directly injected into an inlet of the intermediate pressure steam turbine without being reheated in said reheat device.

2. The method according to claim 1, wherein at least part of the additional solar steam is directly injected into a hot reheat line connecting said reheat device with the inlet of said intermediate pressure steam turbine.

3. The method according to claim 2, wherein said part of the additional solar steam, which is directly injected into a hot reheat line or inlet of said intermediate pressure steam turbine, is controllably throttled, be means of a control valve.

4. The method according to claim 1, wherein in order to avoid cooling of the cold reheat steam in pure solar mode the additional solar steam is injected into the inlet of the high-pressure steam turbine and that at least part of the intermediate pressure steam bypasses the reheat device on its way to the intermediate pressure steam turbine.

5. The method according to claim 1, wherein in order to cater for any circumstances potentially resulting in large temperature changes at the inlets of the steam turbines part of the additional solar steam is directly injected into the cold reheat line connecting the exit of the high-pressure steam turbine and the reheat device and bypasses the reheat device through a reheat bypass line, or is directly injected into a hot reheat line connecting said reheat device with the inlet of said intermediate pressure steam turbine.

6. The method according to claim 5, wherein the high-pressure steam turbine bypass line is provided for bypassing the high-pressure steam turbine, and that part of the additional solar steam flows to the cold reheat line through said high-pressure steam bypass line.

7. The method according to claim 5, wherein the extent of the intermediate pressure solar steam flow is adjusted to simultaneously ensure that the high-pressure steam turbine exit temperatures are within design limits.

8. A combined cycle power plant for conducting the method according to claim 1, wherein said reheat device is provided between the exit of said high-pressure steam turbine and the inlet of said intermediate pressure steam turbine; and the solar thermal plant is connected to the inlet of said high-pressure steam turbine to generate additional solar steam for said steam turbine powertrain, and the additional solar steam is provided to the inlet of said intermediate pressure steam turbine without being reheated in said reheat device.

9. The combined cycle power plant according to claim 8, wherein the solar thermal plant is directly connected to the inlet of said intermediate pressure steam turbine by means of a lower pressure solar steam line.

10. The combined cycle power plant according to claim 9, further comprising a control valve for throttling the solar steam is provided in said lower pressure solar steam line.

11. The combined cycle power plant according to claim 8, further comprising a reheat bypass line is provided between the cold reheat side and the hot reheat side of the reheat device.

12. The combined cycle power plant according to claim 11, further comprising a high-pressure steam turbine bypass line is provided at said high-pressure steam turbine.

13. The combined cycle power plant according to claim 12, wherein said steam turbine powertrain has a common shaft, and that said high-pressure steam turbine is disconnectable from the rest of the shaft to permit more rapid operational transients.

14. The combined cycle power plant according to claim 13, further comprising a self-synchronizing clutch is provided between the high-pressure steam turbine and the rest of the shaft.

* * * * *